United States Patent [19]

Ginosar et al.

[11] Patent Number: 5,247,366

[45] Date of Patent: Sep. 21, 1993

[54] COLOR WIDE DYNAMIC RANGE CAMERA

[75] Inventors: Ran Ginosar, Nofit; Ofra Zinaty, Haifa; Noam Sorek, Kiryat Haroshet; Tamar Genossar; Yehoshua Y. Zeevi, both of Haifa; Daniel J. Kligler, Moshav Zippori, all of Israel

[73] Assignee: i Sight Ltd., Zichron Zaakov, Israel

[21] Appl. No.: 795,350

[22] Filed: Nov. 20, 1991

Related U.S. Application Data

[63] Continuation-in-part of Ser. No. 388,547, Aug. 2, 1989, abandoned.

[51] Int. Cl.[5] .................. H04N 5/30; H04N 5/208; H04N 5/238
[52] U.S. Cl. ..................... 358/209; 358/228; 358/909; 358/166
[58] Field of Search ............... 358/209, 909, 166, 228

[56] References Cited

U.S. PATENT DOCUMENTS

| | | | |
|---|---|---|---|
| 4,450,482 | 5/1984 | Ackermann | 358/160 |
| 4,584,606 | 4/1986 | Nagasaki | 358/209 |
| 4,647,975 | 3/1987 | Alston | 358/209 |
| 4,719,350 | 1/1988 | Alm | 250/330 |
| 4,926,247 | 5/1990 | Nagasaki et al. | 358/43 |
| 5,144,442 | 9/1992 | Ginosar et al. | 358/209 |

OTHER PUBLICATIONS

Stockham, "Image Processing in the Context of a Visual Model", Proceedings of the IEEE, 60(7), Jul. 1972, pp. 838-842.

Xie et al., "Towards the Unification of Three Visual Laws and Two Visual Models in Brightness Perception", IEEE Trans Systems, Man Cybernetics 19(2), Mar./Apr. 1989 pp. 379-382.

Gonzalaz, Digital Imaging Processing, Second Ed., Addison-Wesley, pp. 185-186.

*Primary Examiner*—John K. Peng
*Attorney, Agent, or Firm*—William H. Dippert; Ronald F. Brown

[57] ABSTRACT

The apparatus is a color wide dynamic range video camera which takes a plurality of images at different exposure levels, applies neighborhood processing to each of the images, and then combines the components into a final image.

33 Claims, 10 Drawing Sheets

REDUCED DYNAMIC RANGE COLOR IMAGES

COLOR WIDE DYNAMIC RANGE CAMERA

CROSS-REFERENCE TO RELATED APPLICATION

This application is a continuation-in-part of application Ser. No. 07/388,547, filed Aug. 2, 1989 now abandoned.

BACKGROUND OF THE INVENTION

1. Field of the Invention

The present invention relates to video imagery and more particularly to apparatus and techniques for providing enhancement of color video images.

2. Description of the Prior Art

Various types of video enhancement apparatus and techniques have been proposed. Automatic Gain Control (AGC) techniques have been employed, inter alia, in video signals for reducing the dynamic range of the video signal by subtraction of its DC level. Such a technique is described in U.S. Pat. No. 4,719,350, wherein linear AGC is applied to the video image on a pixel by pixel basis. This technique is applicable only to a solid area which is delimited by a line parallel to the scan direction.

Generally speaking, automatic gain control is employed in video processing only on an interframe basis and not on an intraframe basis.

Additionally, as described in Stockham, "Image Processing in the Context of a Visual Model", Proceedings of the IEEE, 60(7), July 1972, pages 828-842, and Xie, Stockham, "Towards the Unification of Three Visual Laws and Two Visual Models in Brightness Perception", IEEE Trans Systems, Man Cybernetics, 19(2), March/April 1989, pages 379-382 (also, see, Gonzalez, *Digital Image Processing*, Second Edition, Addison-Wesley, pp. 185-186), homomorphic filters as shown in FIG. 3 herein, are used for enhancement of black and white images. The logarithm of the input is calculated by log module 501. The output of log module 501 is received by filter 502, which has a frequency dependent gain which may be either linear or non-linear and which tends to decrease the low frequencies and amplify the high frequencies. The output of filter 502 is received by exponent (or inverse log) module 503. This approach separates the illumination and reflectance components. The illumination component of an image generally has slow spatial variations while the reflectance components tend to vary abruptly, particularly at the junctions of very dissimilar objects. Therefore, homomorphic filters emphasize the detail at the expense of low frequencies. Enhancement of the high spatial frequency of the image (details) by a factor of two and attenuation of the DC component down to half of the original value are typical results of such a method.

SUMMARY OF THE INVENTION

The present invention seeks to provide improved video enhancement apparatus for color images which overcomes limitations of the prior art apparatus and techniques discussed above.

There is thus provided in accordance with preferred embodiments of the present invention, video imaging apparatus including means for providing a plurality of video color images of a scene at different exposure levels, each color image separated into at least three different components, and means for processing the components of the plurality of color images to produce a combined color video image including image information from the plurality of color video images and including enhanced detail a local areas therein.

Further in accordance with preferred embodiments of the invention, the apparatus for processing the plurality of video images comprises apparatus for locally enhancing the dynamic ranges of portions of the combined color video image.

Additionally, in accordance with a preferred embodiment of the invention, the apparatus for processing the plurality of color video images comprises apparatus for preserving edge indicating information in the combined video image.

Further in accordance with embodiments of the invention, the apparatus for processing the plurality of video images comprises apparatus for applying neighborhood transforms to the components of the plurality of color video images.

Additionally, in accordance with a preferred embodiment of the present invention, there is provided video image enhancement apparatus comprising apparatus for providing a plurality of video images of a scene at different exposure levels, each video image including at least three components, and apparatus for processing the plurality of video images to produce a combined video image including image information from the plurality of video images and including enhanced detail at local areas therein.

Additionally, in accordance with preferred embodiments of the invention, apparatus for processing may also include image enhancement apparatus such as histogram equalization apparatus.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENTS

Figure 1:
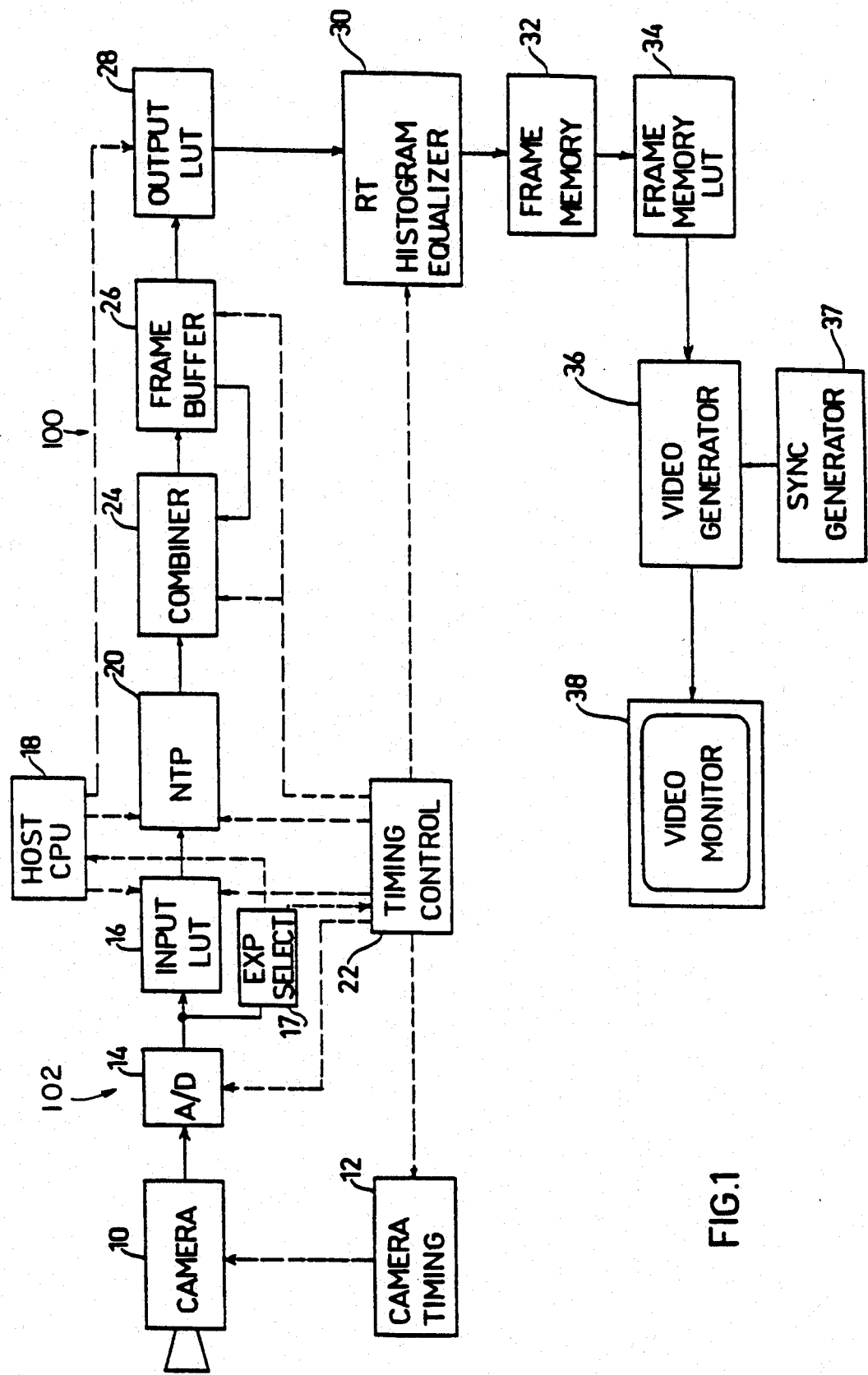
FIG. 1 is a block diagram of a monochrome wide dynamic range camera.

Referring now to the drawings in detail wherein like numerals refer to like elements throughout the several vies, one sees that FIG. 1 is monochrome wide dynamic range system 100 as disclosed in parent application Ser. No. 07/388,547, of which the instant application is a continuation-in-part and the disclosure of which is incorporated by reference. Monochrome wide dynamic range camera 100 comprises a camera 10, such as a CCD, CID, photodiode array or any other visible or non-visible light sensor array which permits the exposure time to be varied by externally supplied control pulses or which permits any other form of external exposure control. Additional components of the monochrome wide dynamic range camera 100 other than camera 10 will be referred to hereinafter collectively as monochrome wide dynamic range system 102.

Monochrome wide dynamic range system 102 further comprises camera timing circuitry 12 which supplies timing pulses to camera 10. The timing circuitry 12 may comprise conventional clocks, counters and frequency dividers. The timing pulses supplied to camera 10 are operative to actuate the photoelectric accumulation of charge in the sensor arrays for varying periods of selectable duration and are also operative to govern the readout of the signal currents produced by sensing through pre-amplifier circuits preferably incorporated within camera 10 to an A/D converter 14. Control of the photoelectric accumulation of charge may be accomplished generally in two ways, by operating a shutter, such as an electronic shutter to control the light input or by controlling the integration time of the sensor array.

Figure 2:
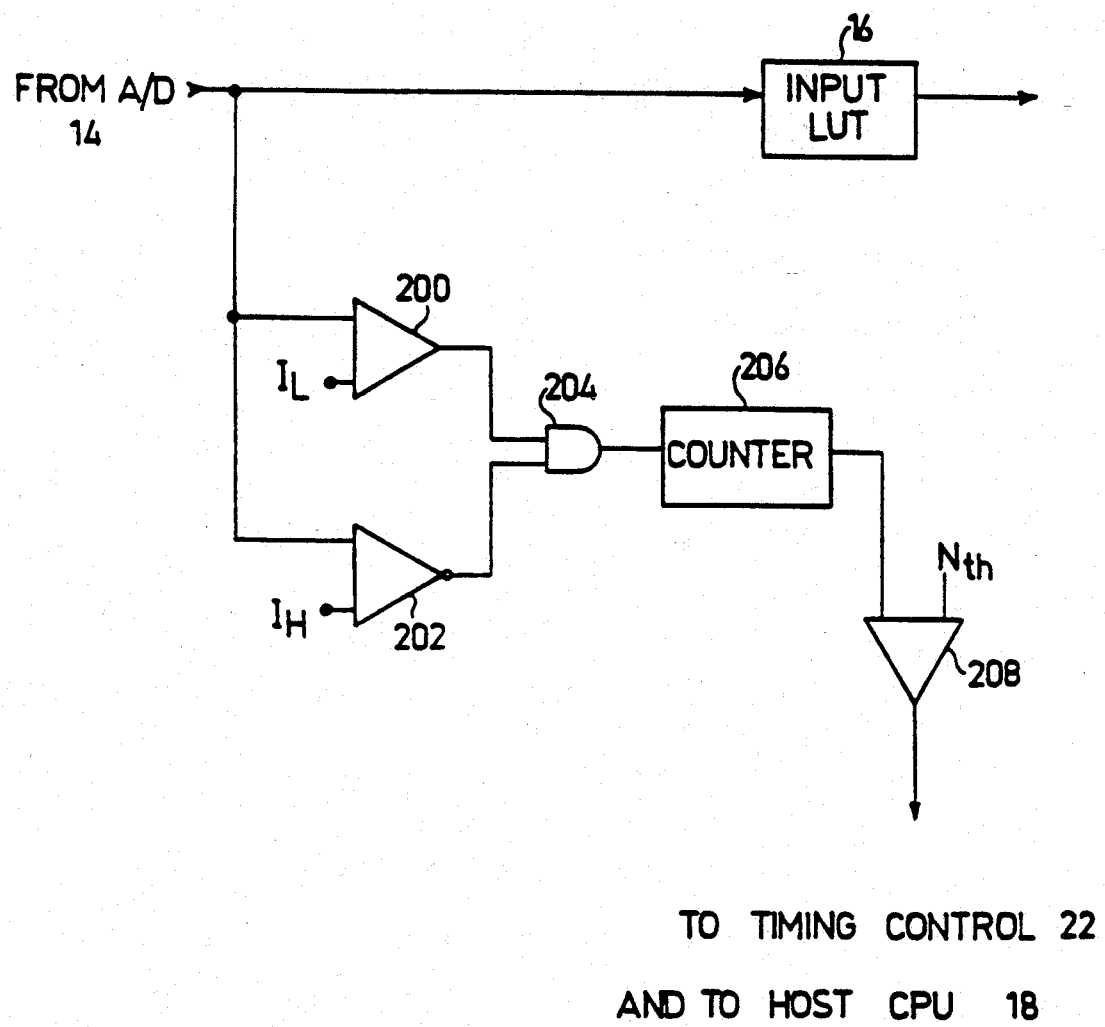
FIG. 2 is a block diagram of an exposure selector forming part of the circuitry of FIG. 1.
Figure 3:
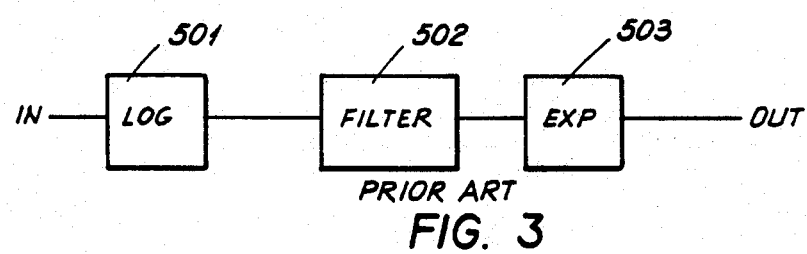
FIG. 3 is a block diagram of the prior art homomorphic filter.

The digitized video data from A/D converter 14 is supplied in parallel to two systems, a look-up table (LUT) 16 and an exposure selector 17. The exposure selector is illustrated in FIG. 2 and comprises first and second comparators 200 and 202 arranged in parallel and outputting to an AND gate 204. Comparator 200 compares the signal from A/D converter 14 with a low threshold level I(L), such as a signal level of 20, in an 8-bit range of 0–255. Comparator 202 compares the signal from A/D converter 14 with a high threshold value I(H), such as 235. If the signal is above 20 and below 235, then the two comparators both generate logic "true" signals which are ANDed by AND gate 204.

The output of AND gate 204 is supplied to a counter 206, for incrementing thereof when two "true" signals are received at AND gate 204.

Counter 206 is reset to zero at the beginning of each frame. If the image of the current frame is mostly saturated, i.e., many pixels are white (having, for example a digital value of 255 or close thereto), then at the end of the frame the counter will contain a very low number. Such will also be the case, if the image is mostly cut-off, i.e., many pixels are black (i.e., having a digital value of 20 or less). Conversely, for "normal" image, which possess a certain spread of values, a large number of the pixels will have values between 20 and 235. For frames of such images, the counter 206 will contain a large number at the end of each frame.

The output of counter 206 is supplied to a comparator 208. At the end of each frame, the output of counter 206 is compared by comparator 208 with a threshold value N(th). This threshold is selected to determine whether the image of the frame was a "normal" one, as opposed to an image that was mainly saturated or cut-off. If the value of the counter 206 output is higher than N(th), then the output of the comparator 208 is a logical "true". That output is supplied to both the timing control circuitry 22 and the host CPU 18 (FIG. 1).

The measurement and determination of whether a certain frame at a given exposure level should or should not be combined with a plurality of frames at different exposure levels may be carried out in at least two ways.

According to one implementation of the monochrome wide dynamic range camera 100, the measurement can be done on a relatively infrequent basis, as determined by the host CPU 18. In such a case, a complete series of exposures, covering the full range of exposures of which the system is capable, is carried out. At the end of each exposure, the output of comparator 208 is received by the host CPU 18.

The host CPU controls the parameters I(L), I(H) and N(th), and can modify them at will. The information gathered assists the host CPU 18 to determine which exposures will be taken or used until the next measurement. Other implementations of the monochrome wide dynamic range camera 100 are described in parent application Ser, No. 07/388,547.

In short, however, the monochrome wide dynamic range camera operates by making two or more exposures—one long exposure, one short exposure and possibly intermediate exposures. Each image is convolved, for example with a three by three kernel consisting of 1+epsilon (wherein epsilon "ε" is between zero and one, and is typically approximately equal to 0.2) at its central point and negative one eighth (-⅛, which in other equivalent formulations may be normalized to negative 1) at the remaining eight circumferential points. The convolved images are then added pixel by pixel. The result is optionally further processed, for instance, including a histogram transform.

Figure 4:
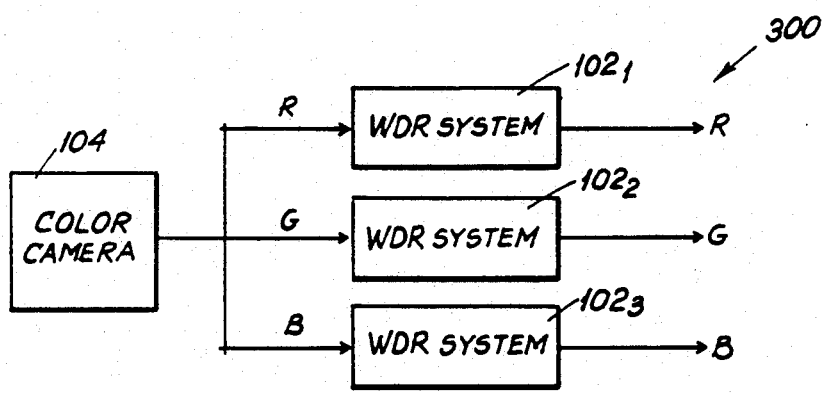
FIG. 4 is a block diagram of a first embodiment of the color wide dynamic range camera.

A first embodiment of the color wide dynamic range camera 300 is illustrated in FIG. 4. Color camera 104 which typically includes a two dimensional sensor array but may include a linear sensor array sends separate red, green and blue components, respectively, to monochrome wide dynamic range systems $102_1$, $102_2$, $102_3$. Each component is processed separately, as if it were a monochrome signal. However, this embodiment is computation intensive and distorts the output color.

Figure 5:
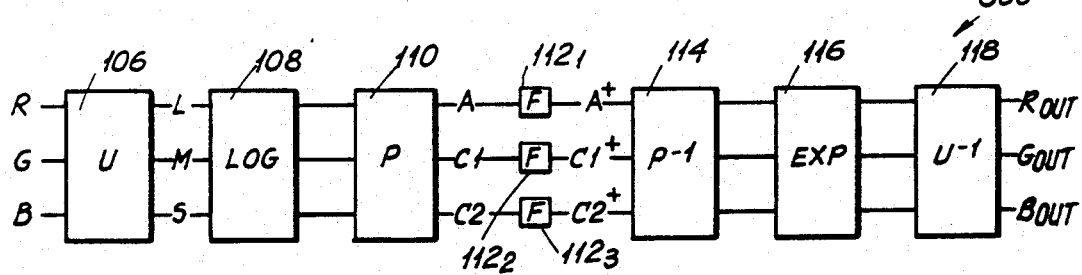
FIG. 5 is a block diagram of a prior art algorithm of Faugeras.

FIG. 5 illustrates a prior art color process or algorithm developed by Faugeras (see Faugeras, PhD thesis, University of Utah, Computer Science 1976, also see Faugeras, "Color Model and Perception", IEEE Transactions ASSP, August 1979) wherein a logarithm is applied and the red, green, blue signals are transformed to achromatic (A) and chromatic (C1, C2) signals (similar to the Y, I and Q signals, respectively, of a color television). Subsequently, high-pass or other filters are applied to each of the three components separately, and the inverse transform and exponentiation reproduce the modified $R_{out}$, $G_{out}$, and $B_{out}$ signals as shown in FIG. 5. FIG. 5 illustrates the U transformation module 106 transforming the R-G-B signals into L-M-S signals. The log transformation module 108 and the P transformation module 110 transform the L-M-S signals into the Faugeras A-C1-C2 signals. Filters $112_1$, $112_2$, and $112_3$ are applied to the A-C1-C2 signals, respectively, to generate A+-C1+-C2+. Filter $112_1$, in particular, is preferably a high-pass filter. P-inverse module 114, exponential module 116 and U-inverse module 118 transform A+-C1+-C2+ to $R_{out}$-$G_{out}$-$B_{out}$.

As may be found in the aforementioned PhD thesis of Faugeras:

$$P = \begin{vmatrix} a*\text{alpha} & a*\text{beta} & a*\text{gamma} \\ u1 & -u1 & 0 \\ 0 & u2 & -u2 \end{vmatrix}$$

a=22.6, alpha=0.612, beta=0.369, gamma=0.019, u1=64, u2=10;

$$U = \begin{vmatrix} .3634 & .6102 & .0264 \\ .1246 & .8138 & .0616 \\ .0009 & .0602 & .9389 \end{vmatrix}$$

$U^{-1}$ and $P^{-1}$ are the corresponding inverse matrices derived by standard matrix algebra techniques.

Figure 7:
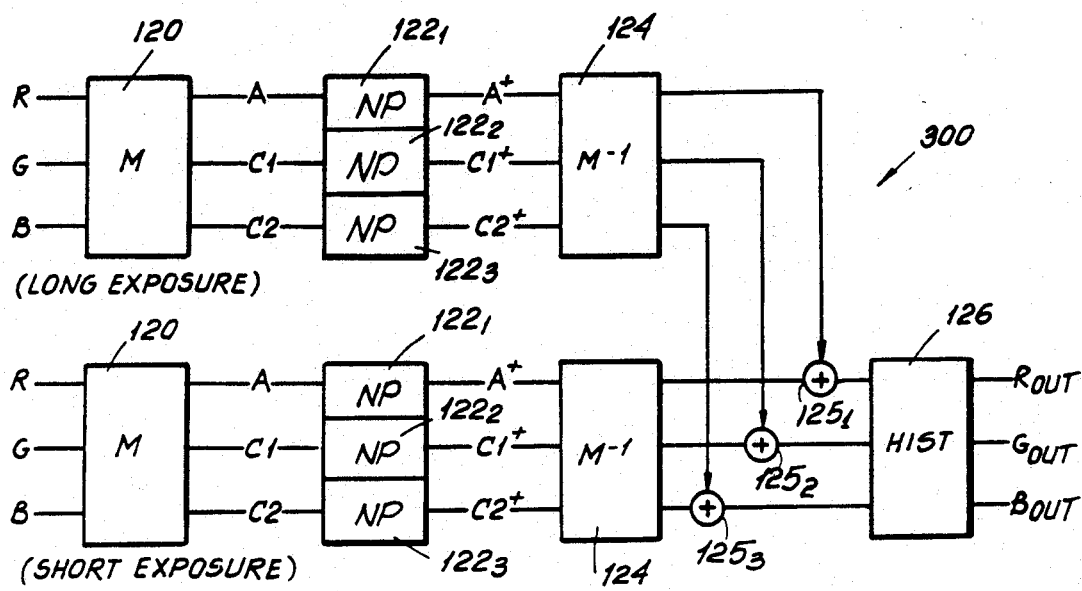
FIG. 7 is a block diagram of a second embodiment of the color wide dynamic range camera showing two separate branches, one for each exposure level.

A second embodiment of the color wide dynamic range camera 300 as shown in FIG. 7. This embodiment eliminates the logarithm module 108 and exponential module 116 and combines the U transformation module 106 and the P transformation module 110 into a single M transformation module which multiplies the input matrix times M which is the matrix algebra product of U and P.

$$M = P * U = \begin{vmatrix} 0.2684 & 0.6749 & 0.0567 \\ 0.6762 & -0.5766 & -0.0997 \\ 0.1604 & 0.2434 & -0.4038 \end{vmatrix}$$

Likewise, M-inverse module 124 multiplies the input matrix times a matrix $M^{-1}$ which is, of course, the inverse of the aforementioned M matrix. Note that the matrix $M^{-1}$ has a first column of all one's.

Neighborhood processing modules $122_1$, $122_2$, $122_3$ typically include convolution kernels which ar all preferably the previously described three by three matrix with a central element of 1+epsilon ($\epsilon$) and the eight peripheral elements equal to negative one eighth ($-\frac{1}{8}$).

Figure 6:
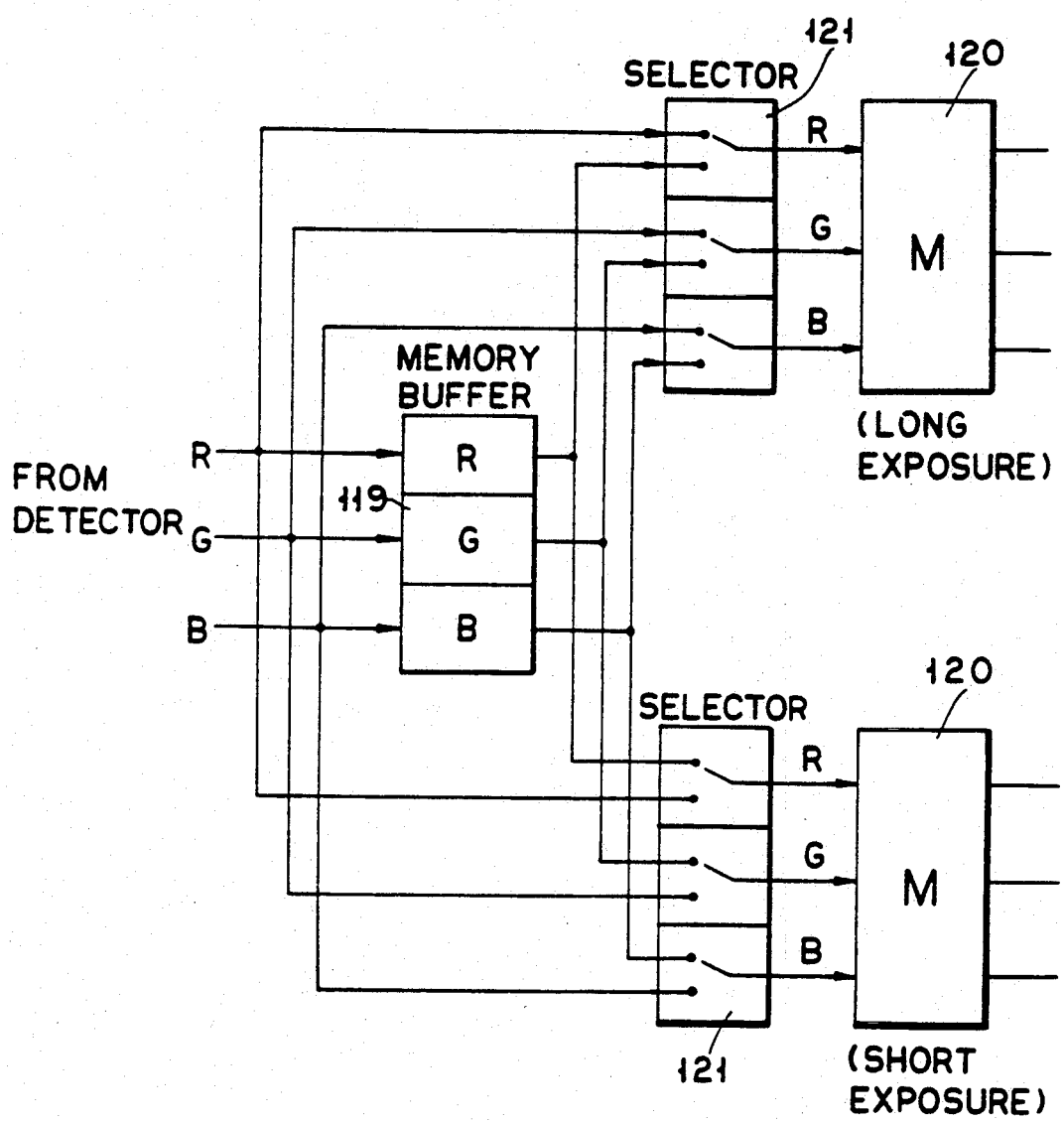
FIG. 6 is a block diagram of the use of single detector for obtaining the required plurality of exposure levels and which may be substituted for the parallel channels of all subsequent embodiments, particularly as shown in FIGS. 7, 8, 12, 13, and 14.

Additionally, this process is applied to two or more separate exposures, and the results are added together pixel by pixel by adders $125_1$, $125_2$ and $125_3$. Subsequently, a histogram transform module 126 or other operations may be applied. The plurality of exposures may be taken from multiple, boresighted detectors, synchronized together and set at different exposure levels, or, as shown in FIG. 6 from a single detector whose exposure level is varied from frame to frame, from field to field, or in the case of a linear array, from scan line to scan line. In the case of a single detector, with input memory buffering is provided by buffers 119, the output of which is selected by selectors 121 so as to provide appropriate short and long exposures to the two input channels in FIG. 7 (also see FIGS. 8, 12, 13, and 14). The term "detector" indicates a single CCD or other sensor array with appropriate associated color filtering or a group of two or three such arrays aligned on a beamsplitter prism in such a manner that each of the sensor arrays detects a separate color component. Methods of color component separation by optical filtering and by beamsplitter prisms are well known in the art. While the figures and embodiments discussed here show RGB color components as input and output, they could equally well use $Y/C_R/C_B$, $Y/C$, Cyan/Magenta/Yellow/Green complementary color mosaic or other color representations.

Figure 8:
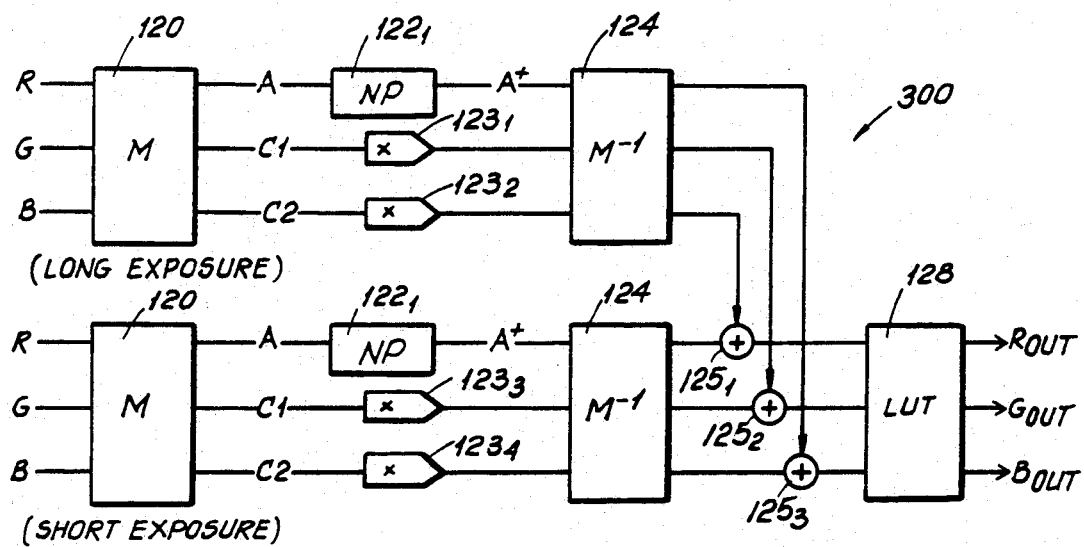
FIG. 8 is a block diagram of a third embodiment of the color wide dynamic range camera.

A third embodiment of the color wide dynamic range camera 300 is illustrated in FIG. 8. In contrast to the embodiment shown in FIG. 7, reduction of the dynamic range is achieved by convolution of the achromatic signal component (A) only while applying point transformations (e.g., look-up tables or fixed gain applied on a pixel-by-pixel basis) to the chromatic components. More specifically, neighborhood processing modules $122_2$, $122_3$ of FIG. 7 are replaced by fixed gain operator modules $123_1$, $123_2$, $123_3$, and $123_4$ which use multiplication factors (which may be different from each other, or may all be the same) typically within the range of 1.0 to 1.5. The higher the value of the multiplication, typically the deeper the color saturation.

Possible programming of the look-up table 128 may provide for histogram scaling, which extends the contrast range of the output image. Alternative programming may provide gamma correction as is widely known in video systems, for example, for the purpose of enhancing the darker parts of the image:

$$I_{out} = k_{gamma} * I_{in}^{gamma}$$

where, for example, gamma is approximately equal to 0.7 and $k_{gamma}$ is in the range of 5.0-11.0.

A fourth embodiment of the color wide dynamic range camera 300 is a simplified hardware version of the third embodiment of the instant invention. The following derivation refers to the output of the matrix multiplication $M^{-1}$ as $<R_{out}, G_{out}, B_{out}>$, refers to only one channel and ignores the output look-up table.

$$\begin{vmatrix} R_{out} \\ G_{out} \\ B_{out} \end{vmatrix} = M^{-1} * \begin{vmatrix} A^+ \\ C1*\text{gain} \\ C2*\text{gain} \end{vmatrix} = M^{-1} * \begin{vmatrix} A^+ - \text{gain}*A \\ 0 \\ 0 \end{vmatrix} +$$

$$M^{-1} * \begin{vmatrix} \text{gain}*A \\ \text{gain}*C1 \\ \text{gain}*C2 \end{vmatrix}$$

Noting that the first column of $M^{-1}$ is all 1's:

$$= \begin{vmatrix} 1 & x & x \\ 1 & x & x \\ 1 & x & x \end{vmatrix} * \begin{vmatrix} A^+ - \text{gain}*A \\ 0 \\ 0 \end{vmatrix} + \text{gain} * M^{-1} * M * \begin{vmatrix} R \\ G \\ B \end{vmatrix}$$

$$= \begin{vmatrix} A^+ - \text{gain}*A \\ A^+ - \text{gain}*A \\ A^+ - \text{gain}*A \end{vmatrix} + \text{gain} * \begin{vmatrix} R \\ G \\ B \end{vmatrix}$$

$$= \text{gain} * \begin{vmatrix} (A^+ - \text{gain}*A)/\text{gain} + R \\ (A^+ - \text{gain}*A)/\text{gain} + G \\ (A^+ - \text{gain}*A)/\text{gain} + B \end{vmatrix}$$

Figure 9:
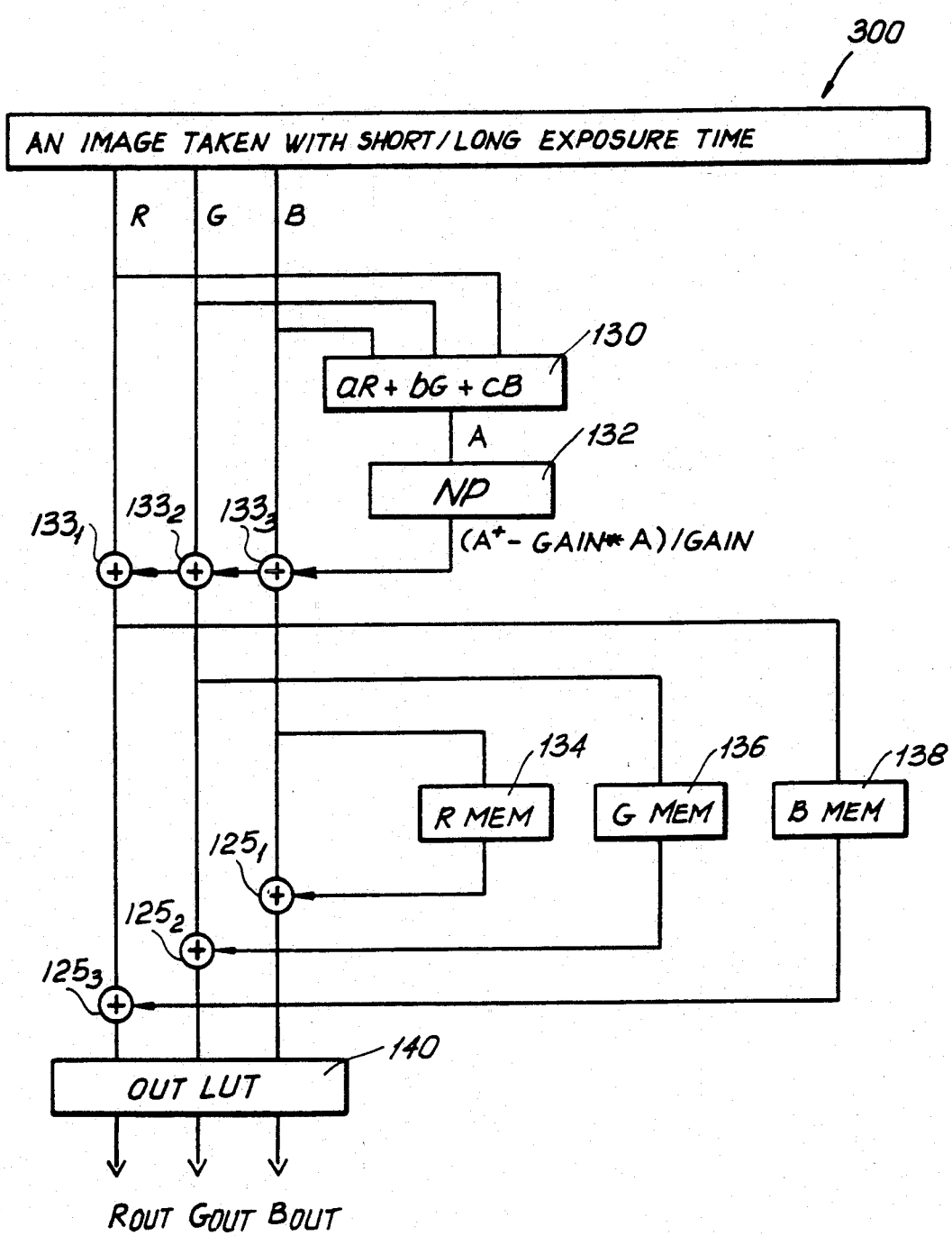
FIG. 9 is a block diagram of a fourth embodiment of the color wide dynamic range camera.

Referring now to FIG. 9 wherein the above formulation is implemented, an image or set of images is divided into red, green and blue components. Multiplier/adder block 130 calculates the achromatic intensity function using a formulation from Niblack, *An Introduction to Image Processing,* pages 59-60, namely, $A = 0.3*R + 0.6*G + 0.1*B$. Neighborhood processing block 132 implements the expression $(A + -gain*A)/gain$ by using a three by three kernel wherein the central element is equal to $(1 + \epsilon - gain)/gain$ and the remaining elements are equal to $-\frac{1}{8}* gain$). Applicants have found empirically that $\epsilon$ should be between 0.2 and 0.4 and that the useful range for gain is between 1.0 and 1.35. The output of neighborhood processing block 132 is merged into the R-G-B signals by adders $133_1$, $133_2$, and $133_3$, respectively.

Memory blocks 134, 136 and 138 store the respectively R, G, and B signals of each frame, for summation with the subsequent frame.

The output look-up table 140 may implement the function:

$$I_{out} = k * (I_{in} * gain)^{gamma}$$

thereby including the multiplication by "gain" required in the above formulation. Gamma is approximately equal to 0.7 and k is substantially between 5 and 10.

Figure 10:
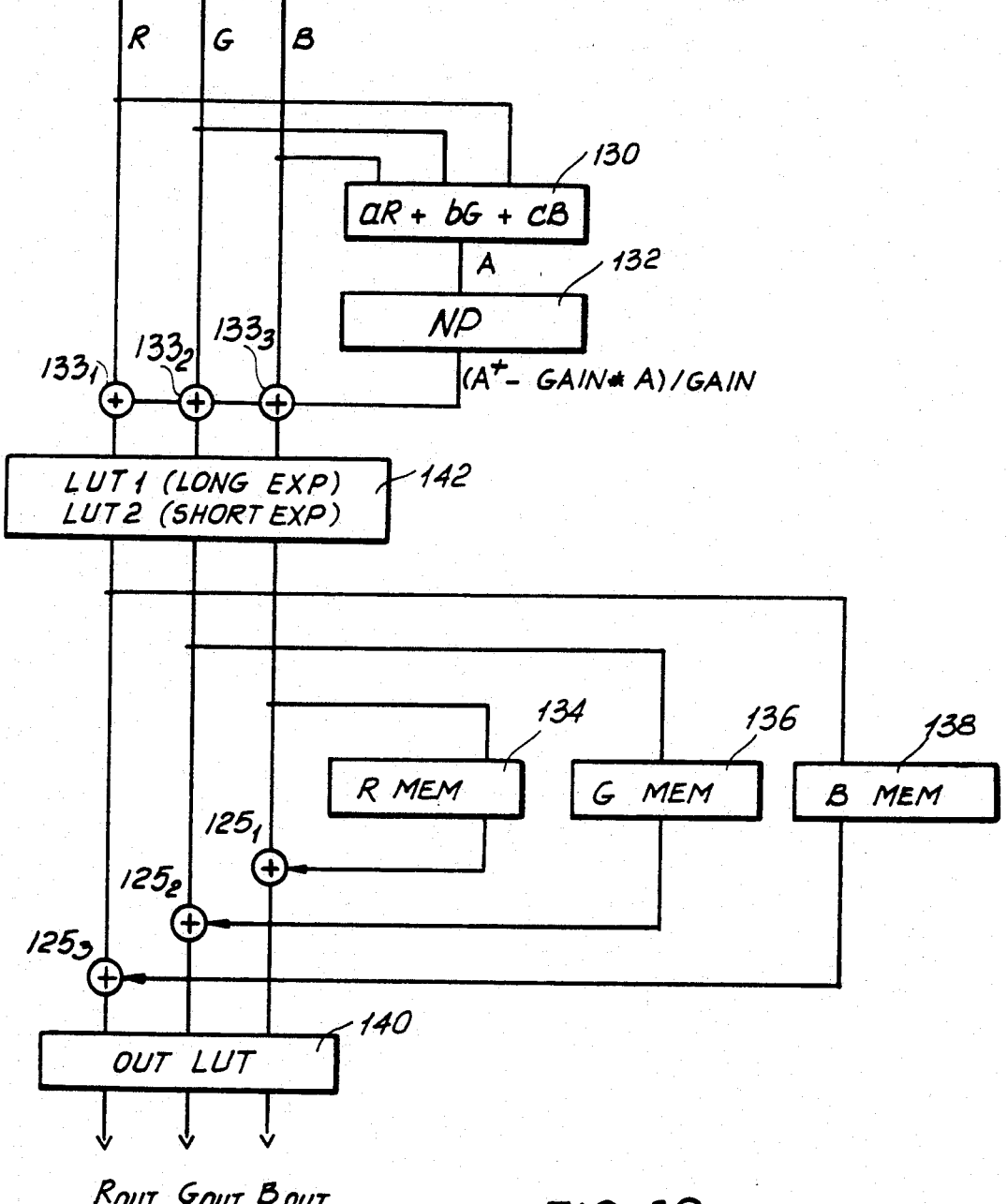
FIG. 10 is a block diagram of a fifth embodiment of the color wide dynamic range camera.

A fifth embodiment of the color wide dynamic range camera 300 as shown in FIG. 10 achieves a higher dynamic range (wider histogram) at the bright areas of the image than is achieved by the heretofore described embodiments. This improvement is achieved by applying different correction look-up tables for the short exposure and long exposure images.

Elements 125, 130, 132, 133, 134, 136, 138, 140 of FIG. 10 are substantially similar to corresponding elements shown in FIG. 9. However, exposure-dependent look-up table 142 is added downstream of the intersection of neighborhood processing block 132 and the R, G and B components of the images. Exposure-dependent look-up table 142 includes a first look-up table (LUT1) which operates on the long-exposure image. A typical function implemented by LUT1 is $LUT1(I) = 5 * I^{0.6}$. Likewise, exposure-dependent look-up table 142 includes a second look-up table (LUT2) which operates on the short-exposure image. A typical function implemented by LUT2 is $LUT(I) = I^{1.1}$. The use of the exposure-dependent look-up table 142 thereby enhances the dynamic range (histogram) of the bright area, thus improving the contrast and compensating for the loss of the saturation of the color in the bright areas which is due to the addition of background DC level from the long exposure frame. Moreover, LUT1 and LUT2 can be modified so as to include the gain factor, thereby allowing the three by three convolution kernel of neighborhood processing block 132 to be simplified to include a central element of epsilon ($\epsilon$) and eight peripheral elements of negative one eighth ($-\frac{1}{8}$).

The output LUT therefore expands only the final histogram by multiplication by a constant factor if necessary (depending upon the display monitor 'not shown'). Its function can be determined automatically by observing the histogram at the output:

$$LUT(I) = \text{minimum (limit, 255/max(R95, G95, B95)} * I)$$

where R95, G95, and B95 are the values that 95% of the pixels of the red, green and blue, respectively, do not exceed. Limit is the highest value displayable on the monitor, usually between 200 and 255 for an eight bit per-pixel monitor. An alternative useful LUT function is:

$$LUT(I) = \text{minimum (limit, limit/max(R95, G95, B95)} * I)$$

These LUT functions are representative examples, but others could equally by chosen. Three parameters can be varied by the user of the system—the sharpness factor epsilon "$\epsilon$" and the contrast and brightness (output histogram factors). The contrast and brightness factors can be set to different values for each of the three color components in order to "white balance" the system.

However, the embodiments described heretofore exhibit the following deficiencies:

1. Narrow dynamic range for the bright areas of the image is created. In these areas, the frame with the long exposure or open iris (or otherwise at a high exposure level) is either saturated or the signal is very high, and relatively uniform. After processing, these areas in the frame with the open iris result in a uniform signal level. In the combined image, this uniform, or "DC", signal adds a white quantity to the image but does not add detail.
2. Moving objects in the image create "motion artifacts". That is, a noticeable shift between the two frames when combined, resulting in double edges and smearing effects.
3. Digital noise in the gamma correction tables is created. When the slope of the gamma correction function is greater than one (steeper than 45 degrees), the steps between adjacent pixel values are increased. Thus, small differences in value which are hardly noticeable, or create the appearance of gradual change, are converted into sharper differences, which create the appearance of edges.

Figure 11:
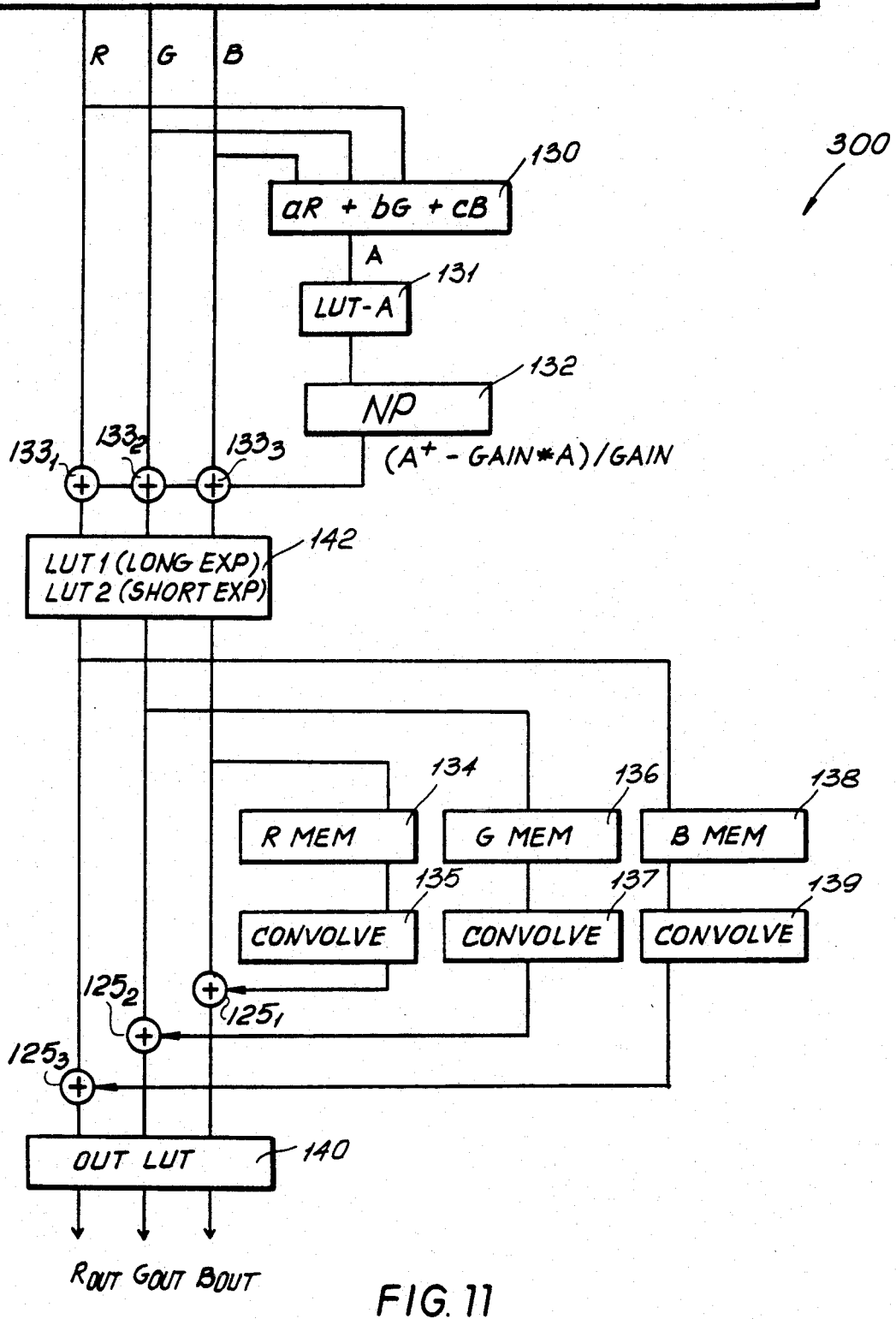
FIG. 11 is a block diagram of a sixth embodiment of the color wide dynamic range camera.

These deficiencies are compensated by the following modifications as shown in a sixth embodiment of the color wide dynamic range camera 300 of FIG. 11. FIG. 11 includes several components which correspond to those of FIG. 10 and includes additional elements as described hereinafter.

1. Before convolution by neighborhood processing block 132, a nonlinear look-up table is applied to the A signal of only the open iris frame by LUT-A 131. A useful function is:

$$LUT(A) = (A^{1.8} / 256^{1.8}) * 256$$

which enhances high intensities so that they will be attenuated more strongly by the convolution which follows. Thus, the spatial average of the brighter areas in the image tends to have a lower "DC" whitening level than the previously described embodiments.
2. To address motion artifacts, a field mode was introduced, in which two fields are acquired at two different irises (or exposure levels) and are combined, rather than two frames. Since the field rate is twice the frame rate in interlaced cameras, the objects move only half as much between fields as they move between frames, and the combined result includes a substantial reduction in the number and degree of motion artifacts.

However, since the two fields are interlaced, the fields do not include the same pixels. The combining algorithm thus combines pairs of neighboring pixels, rather than pairs of the same pixel. This results in some loss of resolution. In this embodiment, this effect is typically corrected by means of a low-pass filter, implemented as a convolution by modules 135, 137, 139, which is added after the frame memory blocks 134, 136, 138 which store the previous field. Neighborhood operation on the memory image enables different treatment of the direct pass of the image and the delayed pass (through memory). Alternately, the kernel of convolver 132 can be modified to include the spatial filtering function, and convolvers 135, 137, 139 can be eliminated.

This spatial filtering is also helpful in reducing the effect of motion artifacts in the frame mode.

3. Output LUT 140 is used for gamma corrections and for histogram corrections. To eliminate digital noise in output LUT 140, a sigmoid ('S' shape) curve can be used, instead of the previously cited mathematically calculated correction. This reduces the slope of the gamma correction function at the problem areas.

While the embodiments described heretofore, based upon an additive algorithm, attain the desired results of capturing and reproducing high contrast color images, these embodiments tend to produce anomalous, unnatural color effects and distortion of true color in and around areas of saturation in the picture. In order to maintain the visual sense of true color in the picture, it is necessary to maintain the ratios of R/G and B/G at their original values, even if the absolute values of R, G and B vary. The heretofore described embodiments including additive algorithms have not maintained these ratios in all cases.

Figure 12:
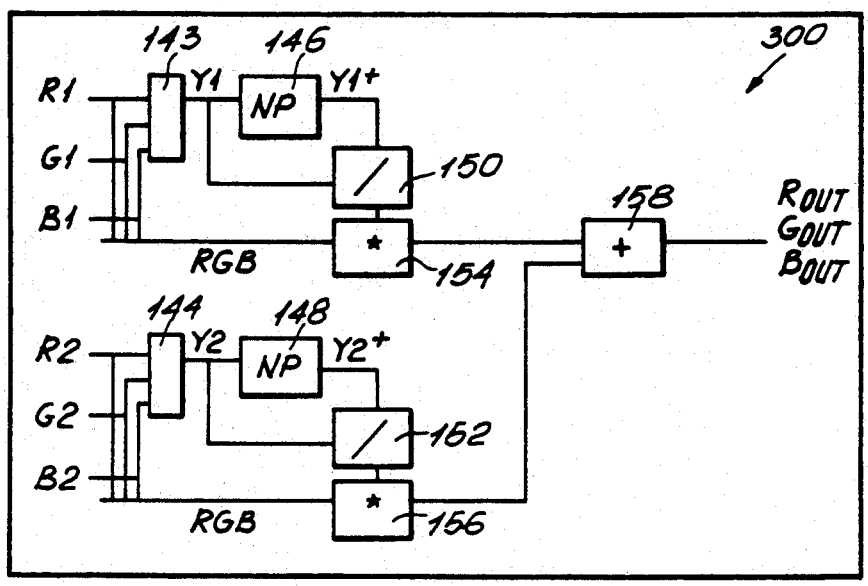
FIG. 12 is a block diagram of a seventh embodiment of the color wide dynamic range camera.

In order to obviate the above-identified deficiencies of the additive algorithms, a multiplicative algorithm was introduced into a seventh embodiment as shown in FIG. 12. In contrast to the additive algorithms of the previous embodiments (wherein, for instance, the result of the convolution, $(A^+ - \text{gain}*A)/\text{gain}$, is added the original R, G and B value), the multiplicative algorithm of FIG. 12 multiplies the R-G-B color components by a function of the luminance (achromatic) signal, so as to maintain the original color component ratios. The luminance function is chosen so as to weight the R-G-B chromatic values at each pixel in each of the two exposures (these two exposures may be obtained by two individual detectors o by the single switched detector configuration shown in FIG. 6) before they are summed together, in order to give greater weight to the information bearing exposure at that pixel. More particularly, as shown in FIG. 12, blocks 143, 144 calculate luminance values $Y_1$, $Y_2$, respectively from the input R-G-B signals from the respective two exposure levels. The luminance values are then convolved by neighborhood processing (NP) blocks 146, 148 (similar to block 132 in the previous embodiments) to obtain edge-enhanced luminance values $Y_1^+$, $Y_2^+$. The purpose of the neighborhood processing (NP) blocks is to give greater weight to portions of the image in a given exposure that are rich in edge information ($Y^+$ substantially different from Y), while suppressing areas of saturation or cutoff, which will by nature contain little edge information ($Y^+$ substantially similar to Y). Weighting factors are subsequently calculated by dividing the convolved luminance values $Y_1^+$, $Y_2^+$ by the unconvolved luminance values $Y_1$, $Y_2$, by division blocks 150, 152, respectively. The resultant weighting factors $Y_1^+/Y_1$, $Y_2^+/Y_2$, are multiplied by the respective color components for each exposure by multiplication blocks 154, 156. The resultant images are combined by block 158 to produce the desired combined output.

Figure 13:
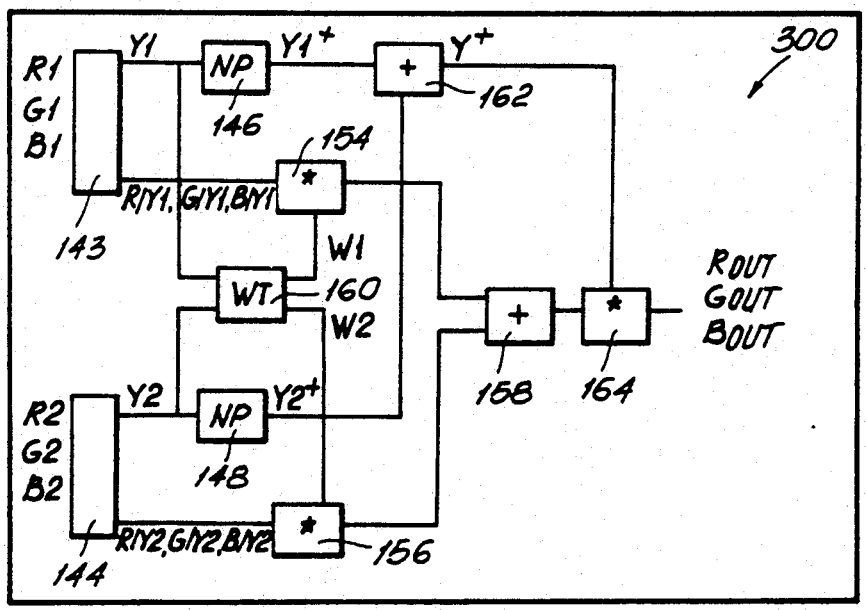
FIG. 13 is a block diagram of a first modification of the seventh embodiment of the color wide dynamic range camera.

An alternative scheme for weighting the color components is shown in FIG. 13. The two intensity channels are processed as before. The two pre-computed weighting functions are provided (which add up to 1.0 for each pixel) by block 160 by means of, for instance, a look-up table. The six color channels are first divided or normalized by the corresponding intensity, then weighted by the weights $W_1$ and $W_2$ by blocks 154, 156, then added together by block 158 and finally multiplied by $Y^+$ (as calculated by adder 162 which adds the two convolved intensities from blocks 146, 148) by block 164. The purpose of scaling the chromatic signals by the corresponding intensity is to make it possible to multiply the resulting color by $Y^+$, so as to maintain the desired intensity relation in the output image.

Figure 14:
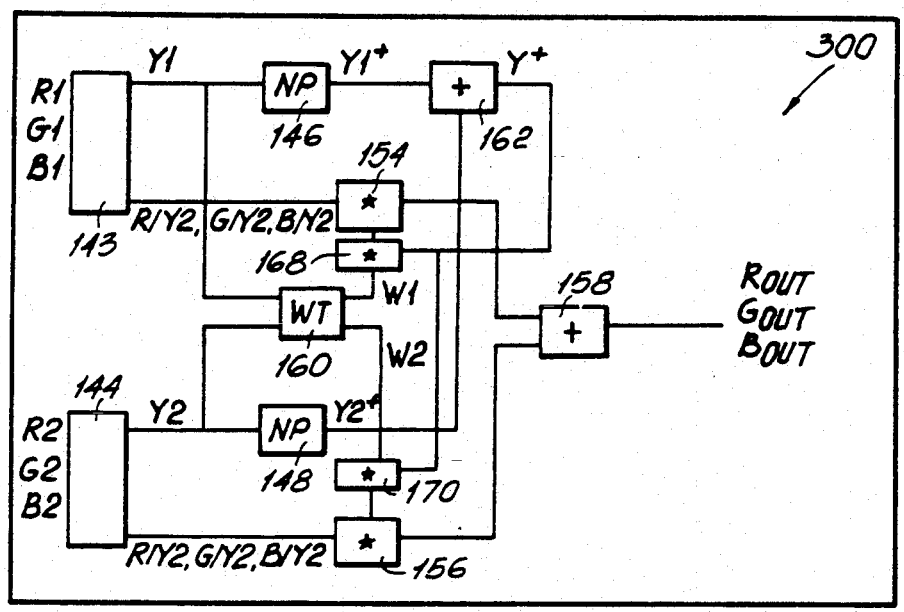
FIG. 14 is a block diagram of a second modification of the seventh embodiment of the color wide dynamic range camera.

FIG. 14 shows a modified version of the proposed architecture which is somewhat more efficient. Instead of multiplying $Y^+$ by each of R, G, B (three products), $W_1$ and $W_2$ are multiplied by $Y^+$ by blocks 168 and 170, respectively, thereby saving one multiplication.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A color wide dynamic range video imaging apparatus comprising:
    sensor means for providing a plurality of color video images of a scene at different exposure levels;
    means for dividing each color video image into components; and
    means for processing said components of each said plurality of color video images to produce a combined color video image including image information from said components by processing at least one of said components wherein said means for processing operates by applying neighborhood processing means to one or more of said components.

2. The color wide dynamic range video imaging apparatus of claim 1 wherein said means for processing includes a first means for transforming each of said plurality of color video images into an achromatic component and two chromatic components; neighborhood processing means for each of said achromatic and chromatic components thereby generating a processed achromatic component and two processed chromatic components; and a second means for transforming said processed achromatic and chromatic components into at least three chromatic output components of each of said plurality of video images.

3. The color wide dynamic range video image apparatus of claim 2 wherein said first means for transforming uses a first matrix multiplier; wherein said second means for transforming uses a second matrix multiplier; and wherein said second matrix multiplier is an inverse of said first matrix multiplier.

4. The color wide dynamic range video image apparatus of claim 3 wherein said first matrix multiplier includes:
    a first row with elements substantially equal to 0.2684, 0.6749, and 0.0567;

a second row with elements substantially equal to 0.6762, −0.5766, and −0.0997; and a third row with elements substantially equal to 0.1604, 0.2434, and −0.4038.

5. The color wide dynamic range video apparatus of claim 2 including one of said means for processing for each of said plurality of video images, and adder means for combining output of each of said means for processing.

6. The color wide dynamic range video apparatus of claim 5 further including histogram means for enhancing output of said apparatus.

7. The color wide dynamic range video imaging apparatus of claim 1 wherein said sensor means comprises a two dimensional sensor array.

8. The color wide dynamic range video imaging apparatus of claim 1 wherein said sensor means comprises a linear sensor array.

9. A color wide dynamic range video imaging apparatus comprising:
sensor means for providing a plurality of color video images of a scene at different exposure levels;
means for dividing each color video image into components; and
means for processing said components of each of said plurality of color video images to produce a combined color video image including image information from said components of each of said plurality of color video images by processing at least one of said components of each of said plurality of color video images, wherein said means for processing comprises a first means for transforming each of said plurality of color video image components into an achromatic component and two chromatic components; neighborhood processing means for said achromatic component to generate a processed achromatic component; gain multiplying means for applying a gain to said chromatic components to generate amplified chromatic components; and a second means for transforming said processed achromatic component and said amplified chromatic components into at least three chromatic output components of each of said plurality of video images.

10. The color wide dynamic range video apparatus of claim 9 wherein said gain multiplying means comprises look-up tables.

11. The color wide dynamic range video apparatus of claim 9 including one of said means for processing for each of said plurality of video images, and adder means for combining output of each of said means for processing.

12. The color wide dynamic range video apparatus of claim 11 further including histogram means for enhancing output of said apparatus.

13. The color wide dynamic range video imaging apparatus of claim 9 wherein said sensor means comprises a two dimensional sensor array.

14. The color wide dynamic range video imaging apparatus of claim 9 wherein said sensor means comprises a linear sensor array.

15. A color wide dynamic range video imaging apparatus comprising:
sensor means for providing a plurality of chromatic color video images of a scene at different exposure levels;
means for dividing each color video image into chromatic components; and
means for processing said components of each of said plurality of color video images to produce a combined color video image including image information from said components of each of said plurality of color video images by processing at least one of said components of each of said plurality of color video images,
wherein said means for processing comprises a means for receiving each of said chromatic components and generating an intensity signal therefrom; means for processing said intensity signal; means for combining said processed intensity signal into aid chromatic components; memory means for storing previous information for each of said chromatic components; means for combining said previous information for each of said chromatic components into said chromatic components; and output look-up table means for transforming said chromatic components.

16. The color wide dynamic range video imaging apparatus of claim 15 further including second processing means receiving an output of said memory means.

17. The color wide dynamic range video imaging apparatus of claim 15 wherein said means for processing further includes an exposure-dependent look-up table between said means for combining said processed intensity signal into said chromatic components and said memory means.

18. The color wide dynamic range video imaging apparatus of claim 17 wherein said means for processing further includes a non-linear look-up table applied to said intensity signal from an image taken at a higher exposure level.

19. The color wide dynamic range video imaging apparatus of claim 18 wherein exposures are taken of different fields and are thereafter combined.

20. The color wide dynamic range video imaging apparatus of claim 19 wherein said output look-up table means includes gamma correction means and histogram correction means.

21. The color wide dynamic range video imaging apparatus of claim 15 wherein said sensor means comprises a two dimensional sensor array.

22. The color wide dynamic range video imaging apparatus of claim 15 wherein said sensor means comprises a linear sensor array.

23. A color wide dynamic range video imaging apparatus comprising:
sensor means for providing a plurality of chromatic color video images of a scene at different exposure levels;
means for dividing each color video image into chromatic components; and
means for processing said components of each of said plurality of color video images to produce a combined color video image including image information from said components of each of said plurality of color video images by processing at least one of said components of each of said plurality of color video images,
wherein said means for processing comprises for each of said plurality color video images;
means for calculating a luminance component from said chromatic components;
means for calculating a convolved luminance component from said luminance component;
means for calculating a weighing factor from at least said luminance component; and means for multiplying said weighing factor times said chromatic components.

24. The color wide dynamic range video imaging apparatus of claim 23 wherein said means for calculating divides said convolved luminance component by said luminance component.

25. The color wide dynamic range video imaging apparatus of claim 23 wherein said sensor means comprises a two dimensional sensor array.

26. The color wide dynamic range video imaging apparatus of claim 23 wherein said sensor means comprises a linear sensor array.

27. A color wide dynamic range video imaging apparatus comprising:
sensor means for providing a plurality of color video images of a scene at different exposure levels;
means for dividing each color video image into chromatic components; and
means for processing said components of each of said plurality of color video images to produce a combined color video image including image information from said components of each of said plurality of color video images by processing at least one of said components of each of said plurality of color video images,
wherein said means for processing comprises for each of said plurality color video images;
means for calculating a luminance component from said chromatic components;
means for dividing said chromatic components by said luminance component to produce normalized chromatic signals;
means for calculating a processed luminance component from said luminance component;
means for calculating a weighing factor from at least said luminance component of each of said plurality of color video images; and
means for multiplying said weighing factor times said normalized chromatic components.

28. The color wide dynamic range video imaging apparatus of claim 27 further including a means for adding said processed luminance components from each of said plurality of color video images and multiplying an output therefrom times said combined color video image.

29. The color wide dynamic range video imaging apparatus of claim 27 wherein said sensor means comprises a two dimensional sensor array.

30. The color wide dynamic range video imaging apparatus of claim 27 wherein said sensor means comprises a linear sensor array.

31. A color wide dynamic range video imaging apparatus comprising:
sensor means for providing a plurality of color video images of a scene at different exposure levels;
means for dividing each color video image into components; and
means for processing said components of each of said plurality of color video images to produce a combined color video image including image information from said components of each of said plurality of color video images by processing at least one of said components of each of said plurality of color video images, wherein said means for processing comprises a first means for transforming each of said plurality of color video image components into an achromatic component and two chromatic components; neighborhood processing means for each of said achromatic and chromatic components to generate a processed achromatic component and two processed chromatic components; and a second means for transforming said processed achromatic and chromatic components into at least three chromatic output components of each of said plurality of video images.

32. The color wide dynamic range video imaging apparatus of claim 31 wherein said sensor means comprises a two dimensional sensor array.

33. The color wide dynamic range video imaging apparatus of claim 31 wherein said sensor means comprises a linear sensor array.

* * * * *